(12) United States Patent
Chaiken et al.

(10) Patent No.: US 7,052,757 B2
(45) Date of Patent: May 30, 2006

(54) CAPPING LAYER FOR ENHANCED PERFORMANCE MEDIA

(75) Inventors: Alison Chaiken, Fremont, CA (US); Gary Gibson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 398 days.

(21) Appl. No.: 10/678,431

(22) Filed: Oct. 3, 2003

(65) Prior Publication Data

US 2005/0074576 A1 Apr. 7, 2005

(51) Int. Cl.
*B32B 3/02* (2006.01)

(52) U.S. Cl. .................. 428/64.1; 428/64.4; 428/64.5; 428/64.6; 430/270.13

(58) Field of Classification Search ............... 428/64.5, 428/64.6; 430/270.13
See application file for complete search history.

(56) References Cited

U.S. PATENT DOCUMENTS 5,557,596 A 9/1996 Gibson
2004/0086802 A1* 5/2004 Gibson .................. 430/270.13

* cited by examiner

*Primary Examiner*—Elizabeth Mulvaney

(57) ABSTRACT

A media storage device and method for fabricating said device is provided. The device comprises a data layer capable of storing and erasing data via application of an energy beam, such as a near field optical non diffraction limited beam or electron beam. A separate capping layer is deposited on the data layer. The separate capping layer is relatively transparent to the energy beam and may be formed from various materials, including but not limited to an epitaxial material, a conducting material, and a robust high melting point material, such as Molybdenum.

39 Claims, 3 Drawing Sheets

CAPPING LAYER FOR ENHANCED PERFORMANCE MEDIA

BACKGROUND OF THE INVENTION

1. Field of the Invention

The present invention relates generally to the field of thermal writing of high density data media, and more particularly to the specific composition and methods of forming high density data recording products for use in near-field optical and electron beam writing.

2. Description of the Related Art

Phase-change media are a widely available means for providing high density data storage, and such media may include CD-RW, DVD-RAM, and DVD-RW formats, among others. In this type of media, data is stored at a particular location, typically micron sized, and storage and erasure occurs based on the microstructure of the target region. Microstructures are either crystalline or amorphous. Bit writing in crystalline media requires melting the desired region and then rapidly quenching the region to a glassy state. Bit erasure involves transitioning from this glassy state using relatively slow, gentle heating to produce recrystallization. Writing and erasure processes therefore require depositing significant amounts of energy into the phase change medium, also referred to as the phase change layer or data layer, which in the past has typically been a ternary compound of germanium, antimony, and tellurium, GeSbTe, also known as GST.

In this setting, ablation of the phase change medium or chemical changes introduced to the medium can be highly undesirable, and may introduce imperfections in the media and/or impede the ability to write and erase data bits on the media. Preventing unwanted ablation or chemical changes in the past has entailed cladding the GST layer between thick films of amorphous zinc sulfide-silicon oxide ($ZnS-SiO_2$) dielectric material. The cladding layers tend to prevent ablation and chemical changes to the phase change medium and are compatible with the recording process due to their transparency to visible light. Additionally, the cladding layers offer significant resistance to heat conducted from the low melting temperature GST layer. Such an optical stack may also include an aluminum (Al) or gold (Au) layer which acts as a mirror and can provide a high conductance heat sink for the other layers. A typical $ZnS-SiO_2/GST/ZnS-SiO_2/Al$ stack may be embedded in polycarbonate for durability purposes and ease of use by end users or consumers.

More recent memory designs have begun to employ near-field optics or electron beams in thermal writing. See, for example, U.S. Pat. No. 5,557,596, "Ultra High Density Storage Device," issued Sep. 17, 1996 to inventor Gary A Gibson. The '596 patent provides for a plurality of electron emitters generating beams of electrons to information storage media areas on a movable platform to store and retrieve information. A micro mover, based on micro electro mechanical systems (MEMS) technology, moves the platform relative to the electron emitters to enable parallel communications with selected storage media areas on the platform. In the '596 patent, the data storage medium includes a diode whose top layer is a phase-change material that can be reversibly changed between crystalline and amorphous states (or between two crystalline states with different electrical properties). Data is written using an electron beam to locally effect a change of state in the phase-change layer. Bits are detected by interrogating a bit with an electron beam while monitoring the current induced in the diode. This induced current depends upon the local state of the phase-change layer in the interrogated region.

In near-field optical and electron beam thermal writing systems, the aforementioned thick stack ($ZnS-SiO_2/GST/ZnS-SiO_2/Al$ or $ZnS-SiO_2/GST/ZnS-SiO_2$) cannot be used for various reasons. First, near-field writing requires that the optical probe pass within much less than one wavelength of the media surface, which is generally incompatible with typical $ZnS-SiO_2$ cladding thicknesses employed, as well as being incompatible with the polycarbonate used to cover the media. In electron beam thermal writing, electron beams typically cannot penetrate through relatively thick cladding layers unless extremely high beam energies are employed, which is impractical. Furthermore, thick insulating cladding layers tend to charge and deflect the electron beam, which is also undesirable.

The problems of ablation and chemical modification of the data layer remain, however, in the presence of near-field optical and electron beam thermal recording schemes.

It would be advantageous to provide a design having the advantages associated with inhibiting ablation and chemical modification in high density and ultra high density media, while at the same time enabling near-field optical and electron beam thermal writing and erasure of said media in a relatively efficient manner.

SUMMARY OF THE INVENTION

According to a first aspect of the present design, there is provided a a data storage and retrieval medium. The data storage and retrieval medium comprises a data layer capable of storing and erasing data via application of an energy beam, and a separate capping layer deposited on the data layer, the separate capping layer being relatively transparent to the energy beam and comprising at least one material from a group comprising an epitaxial material, an electrically conducting material, a robust high melting point material, and the robust high melting point material combined with a thin dielectric layer.

According to a second aspect of the present design, there is provided a a data storage and retrieval medium, comprising an alterable data layer having the ability to be altered by an energy beam and a separate capping layer deposited atop the data layer, the separate capping layer being relatively transparent to the energy beam and comprising at least one material from a group comprising a robust high melting point material, an electrically conductive material, an epitaxial material, and the robust high melting point material combined with a thin dielectric layer.

According to a third aspect of the present invention, there is provided a a method for fabricating data storage and retrieval media, comprising providing a data layer capable of alteration via application of an energy beam and depositing a capping layer upon the data layer, the capping layer being relatively transparent to the energy beam and comprising at least one material from a group comprising a robust high melting point material, an electrically conductive material, a highly anisotropic layered material, and an epitaxial material.

According to a fourth aspect of the present invention, there is provided a a method for fabricating data storage and retrieval media, comprising providing a data layer alterable via application of an energy beam and depositing a capping layer upon the data layer, the capping layer being relatively transparent to the energy beam and comprising at least one material from a group comprising an epitaxial material, a conducting material, a highly anisotropic layered material, a robust high melting point material, and the robust high melting point material combined with a dielectric layer.

These and other advantages of all aspects of the present invention will become apparent to those skilled in the art after having read the following detailed disclosure of the preferred embodiments illustrated in the following drawings.

DESCRIPTION OF THE DRAWINGS

The present invention is illustrated by way of example, and not by way of limitation, in the figures of the accompanying drawings in which.

DETAILED DESCRIPTION OF THE INVENTION

The present design includes various capping layers employing different materials wherein use of these materials tends to increase the overall effectiveness of writing to and reading from the media in the presence of near-field and electron beam recording devices. As used herein, the term "materials" includes all kinds and types of compounds, alloys and other combinations of elements. Also, as used herein, the terms "cladding layer" and "capping layer" are used interchangeably, and both terms indicate the topmost or outermost layers of the stack above or away from the base layers. Further, as used herein, the term "data layer" may be construed to mean multiple physical layers of similar or varying materials. In practice, a "data layer" may in many cases include multiple thin film layers composed of differing materials.

Different forms of data storage and retrieval devices include, for example, photodiodes and cathododiodes, phototransistors and cathodotransistors, photoconductive and cathodoconductive devices, photoluminescent and cathodoluminescent devices, as well as combinations and variations thereof. In addition, various types of junctions have been formed in conjunction with one or more of the above devices, such as heterojunctions, in order to achieve the desired detection results. In heterojunctions, two dissimilar semiconductors are used on opposite sides of the junction. Formation of these junctions and the properties thereof can benefit from media employing the current design, and the current design in certain aspects uses the construction of these devices and junctions to provide improvements over previously available media.

Figure 1:
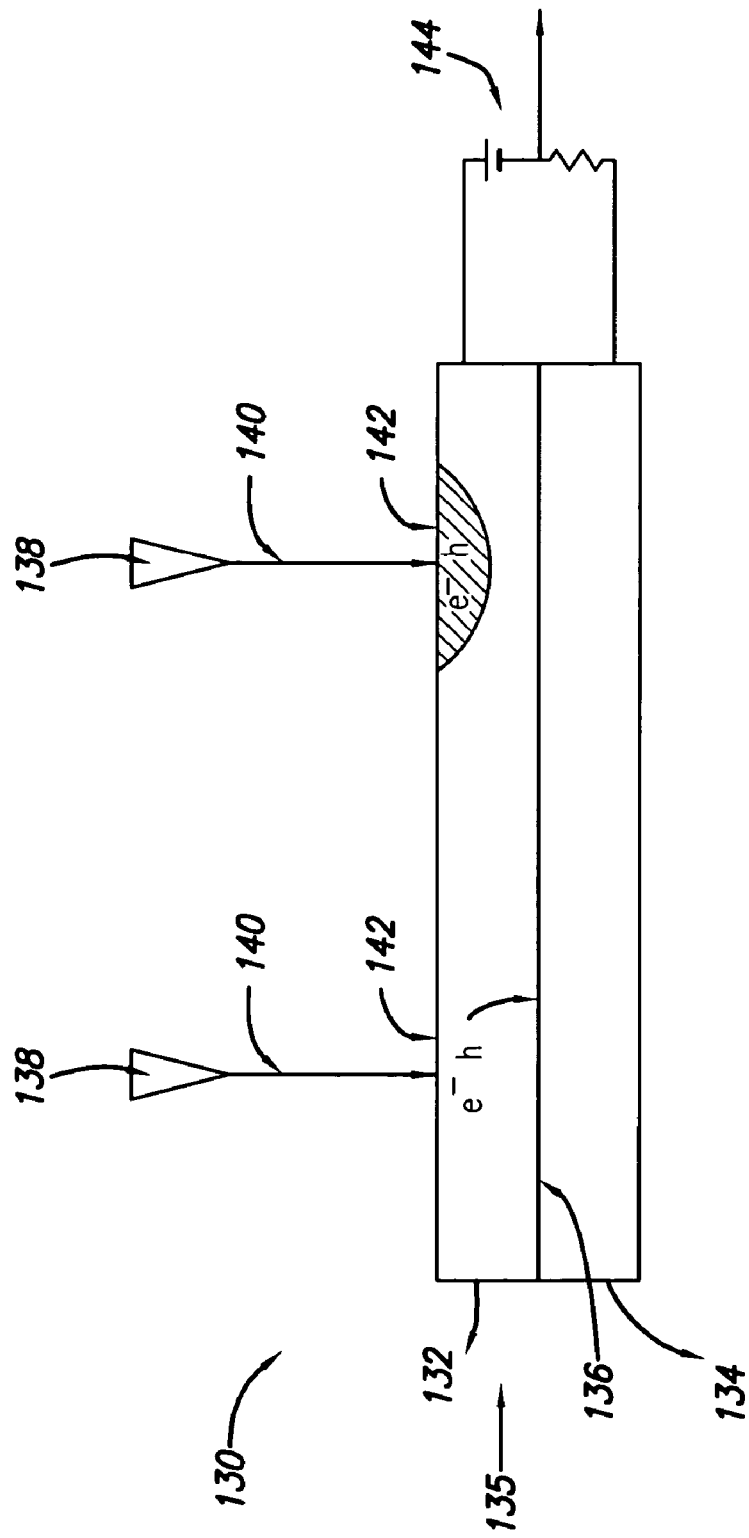
FIG. 1 illustrates a typical photodiode (light beams) or cathododiode (electron beams) data storage and retrieval device.

FIG. 1 shows a typical photodiode (light beams) or cathododiode (electron beams) data storage and retrieval device 130. A data storage layer 132 is disposed on an additional layer 134 to form the diode 135. The diode can be any type that provides a built-in field for separating charge carriers, such as a p-n junction, pin-junction or Schottky barrier device, depending on the materials used.

Emitters 138 direct light beams or electron beams onto the storage layer 132. The system writes a data bit by locally altering the state at areas 142 of the storage layer 132. The different states of the storage areas 142 provide a contrast in bit detection during the read function.

During the read function, the emitters 138 emit a lower power density beam to locally excite charge carriers in the storage areas 141 and 142 of the diode 135. If carriers are excited in the storage layer 132, the number of carriers created (the "generation efficiency") will depend on the state of the storage areas 141, 142 where the light or electron beams 140 are incident.

Among the factors that affect the generation efficiency are the band structure of the storage layer and geminate recombination. Some fraction of the generated carriers of one sign (electrons or holes) will be swept across the diode interface 136 (the "collection efficiency") under the influence of a built-in field. An additional field may be applied across interface 136 by a voltage source 144. The current that results from carriers passing across the diode interface 136 can be monitored by a detection signal taken across the interface 136 to determine the state of data storage areas 141, 142. The collection efficiency is dependent upon, among other things, the recombination rate and mobility in and around the area on which the read photons are incident and the effect of the built-in fields.

Thus, variations in the current generated across the diode 135 by the read photons or electrons can depend on both the local generation efficiency and the local collection efficiency. Both of these factors are influenced by the state of the region upon which the photons or electrons are incident. The phase-change material of storage layer 132 can be comprised of a number of phase change materials, such as chalcogenide-based phase-change materials, with the appropriate electrical properties, such as bandgap, mobility, carrier lifetime and carrier density.

The current design replaces the ZnS—SiO$_2$ cladding layer traditionally employed in conventional optical recording media with a cladding layer compatible with the close proximity requirement of near-field optical recording and/or the electron transparency requirement of e-beam recording. With optical recording, the capping or cladding layer provides benefits for the design when it is as transparent as possible to device writing and reading beams. The cladding layer may melt at a high temperature so as not to be affected by the writing process, may be chemically nonreactive with the data layer, may not interdiffuse with the data layer, and may provide good mechanical qualities, such as mechanical stability. For near-field recording, the cladding layer may be thin. For electron beam recording, the cladding layer may be thin and composed of low atomic number elements and/or low mass density elements to have maximum transparency to electrons. As used herein, an element or material having a "low" atomic number means that the element or material has an atomic number generally below 75, and in cases not involving tungsten, generally below 45. Also as used herein, the term "low mass density" generally means a mass density generally lower than or similar to Si, which is approximately 2.33 g/cm$^3$, and has an atomic number of 28). Different types of capping layers may be employed in near-field optical and e-beam recording than the cladding layers previously employed with conventional optical recording. As used herein, the term "energy beam" is used to signify focused energy beams, such as a near-field optical non-diffraction limited beam or an electron beam, as differentiated from beams used in conventional optical recording.

Figure 2:
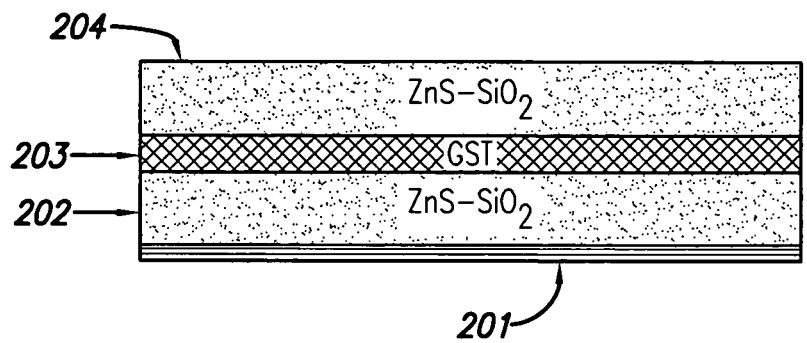
FIG. 2 shows the previous layering employed with conventional optical recording media, specifically a ZnS—SiO$_2$/GST/ZnS—SiO$_2$/Al construction.

FIG. 2 shows the previous layering employed with conventional optical recording media. A $ZnS—SiO_2/GST/ZnS—SiO_2/Al$ construction is presented, with the aluminum layer 201 on the bottom, one zinc sulfide-silicon oxide layer 202 above, the GST phase change layer 203 deposited above zinc sulfide-silicon oxide layer 202, and a second zinc sulfide-silicon oxide layer 204 deposited above the GST phase change layer 203.

In cases where these two-dimensional materials are used as phase-change layers, such layers may include primarily, but not completely, chalcogen-based materials. These two-dimensional layered materials include the following class of materials:

the III–VI compounds InTe, InSe, GaSe, GaS, and the hexagonal (metastable) form of GaTe, the IV–VI compounds GeS, GeSe, SnS, SnSe, $SnS_2$, $SnSe_2$, and $SnSe_{2-x}S_x$, the metal dichalcogenides $SnS_2$, $SnSe_2$, $WS_2$, $WSe_2$, $MoS_2$, and $MoSe_2$, the transition metal chalcogenides $TiS_2$, $TiS_3$, $ZrS_2$, $ZrS_3$, $ZrSe_2$, $ZrSe_3$, $HfS_2$, $HfS_3$, $HfSe_2$, and $HfSe_3$, certain modifications, e.g. certain crystalline structures, of $Ga_2S_3$, $Ga_2Se_3$, $Ga_2Te_3$, $In_2S_3$, $In_2Se_3$, $In_2Te_3$, $GeS_2$, $GeAs_2$, and $Fe_3S_4$, and all ternary materials having a 2-D layer structure, including ternary chalcogenides having a 2-D layer structure, such as $ZnIn_2S_4$ and $MnIn_2Se_4$. Further materials that may be used in the stack are discussed in currently pending U.S. patent application Ser. No. 10/286,010, filed Oct. 31, 2002, inventor Gary A. Gibson, entitled "Two-Dimensional Materials and Methods for Ultra-High Density and Data Storage."

Generally, capping layers over the aforementioned materials and material combinations can provide certain benefits for storage and retrieval media. First, a capping layer can prevent damage from adverse conditions such as ablation or reaction with ambient contaminants while in the process of writing, erasing, or reading data to or from the medium. In general, the writing (amorphizing) process creates the most damage to the media, followed by erasure (recrystallization), and then reading. A cap can also prevent slow, irreversible changes to the media while the media is not being used. Such slow, irreversible changes may include outgassing of the constituents, reaction with ambient contaminants at room temperature, and other adverse effects.

Second, the capping layer can provide an electrically conductive contact extending over the entire medium. Electrical conductivity is important in a cap when the resistivity of the phase-change layers is relatively high. When the phase change layers are relatively highly resistive, a contact with the top layer of the diode (top phase-change layer) that is away from or "off to the side" of the region where data storage occurs provides for relatively high series resistance between the data region and the contact, which can be advantageous.

Third, the capping layer may aid in the writing or erasing processes. For example, a capping layer may provide thermal properties that result in a better temperature distribution during these processes or, in certain cases, may act as a template for the recrystallization of the phase-change layer during erasure.

Construction and performance of a capping layer depends generally upon which of the three foregoing potential benefits applies to the particular situation faced. In all cases, bits cannot be read unless a significant fraction of the electron beam penetrates the cap, so the cap must generally either be relatively thin or made of a material with a long penetration depth. A long penetration depth generally mandates that the material have a relatively low average atomic number and/or low mass density. In general, the thinner the material is, the greater a mass density and/or atomic number that can be employed. Also, the higher the beam energy, the more the mass density and atomic number requirements may be relaxed. Further, the capping layer or layers in may instances must adhere relatively well to the phase-change layer. In order to prevent damage, the capping material needs to be relatively robust and have a relatively high melting point to withstand writing and erasing processes.

Based on the foregoing, molybdenum (Mo) is a relatively robust, refractory material. Mo may be layered in a relatively thin layering process and will survive the writing process. Mo also exhibits reasonable electrical conductivity. Certain low mass density, low Z materials that may be employed as capping layers are generally not as robust as Mo, so use of these materials as capping layers may require significant thickness for survival during the writing process, neutralizing the benefits associated with low mass density.

In the present design, the cap is constructed to benefit an ultrahigh density probe (near-field optical probe or focused electron beam). In general, a conducting material may not operate adequately if the conducting material is not sufficiently transparent to photons of the appropriate wavelength or electrons of the appropriate energy. The critical design parameter in this environment is the characteristic of the layer being employed, and not simply the material employed. A material may have a long penetration depth for electrons of a given energy, but a layer is only sufficiently transparent to electrons and can only operate appropriately in the given conditions if the layer has an appropriate combination of penetration depth and thickness.

The present design employs layering that provides benefits such as those outlined above having the following attributes: epitaxial materials; electrically conductive materials; materials having a relatively low average atomic number and/or low mass density; and/or a robust, high-melting point material thin enough to be reasonably electron transparent, such as Mo. Certain previous layering designs, such as the previously discussed $ZnS—SiO_2$ design, may have a low Z level, but such layers are typically applied at too large a thickness to be sufficiently transparent to the low energy electrons employed in, for example, e-beam applications.

Generally, low mass-density and low Z materials correspond to conditions having a tendency to provide a relatively long electron penetration depth. Length of electron penetration depth depends on both of these factors, mass density and atomic number, as well as the energy of the incident electrons. Thus the present design may apply to capping layers that are relatively transparent to the energy beam, where "relatively transparent" indicates the ability for a large fraction of the energy of the energy beam to penetrate the capping layer. Low mass density and low atomic number characteristics are primarily relevant when the energy beam is an electron beam. In general, low mass density/low atomic number attributes do not provide long penetration depths for light. However, it is to be understood that the materials and layers employed in the present design are generally "relatively transparent" to the energy beam employed.

Epitaxial materials employed in the present design may include, for example, epitaxial cubic materials, such as calcium fluoride (CaF$_2$). CaF$_2$ grows in single crystal form on Si(111), a generally available silicon substrate having 111 planes of silicon parallel to the surface of the material. CaF$_2$ provides a lattice-matched capping layer to films that grow epitaxially on Si(111). Examples of films that grow epitaxially on Si(111) include indium selenium (InSe) and gallium selenium (GaSe). CaF$_2$ melts at approximately 1400 degrees centigrade, is generally non-reactive, is composed of relatively low atomic number elements, and is generally transparent to visible light. CaF$_2$ may also be employed as a buffer layer to provide electrical isolation between the InSe/GaSe heterojunction and the substrate silicon if such a buffer layer is desired.

Figure 3:
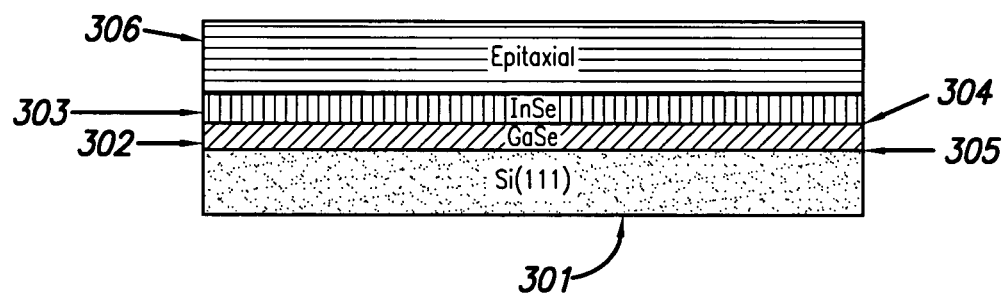
FIG. 3 illustrates a construction of media using an epitaxial material as the capping layer.

FIG. 3 illustrates a typical construction of media using an epitaxial cubic material such as CaF$_2$. From FIG. 2, the Si(111) layer 301 forms the bottom layer. A first film layer 302 of p-type GaSe is grown on the Si(111) layer 301. GaSe is readily grown epitaxially on Si(111) despite the lattice mismatch. A second film layer 303 of n-type InSe is then grown on the first film layer 302 of GaSe. Alternately, InSe may be grown directly on a GaSe crystal, without using a silicon substrate.

In this arrangement, the InSe second film layer 303 forms the phase change layer or recording layer for the media. The resultant structure at this point is a three dimensional anisotropic structure, and the capping material may be placed directly on the InSe second film layer 303 atop this three dimensional structure.

The InSe/GaSe/Si combination forms junctions at the InSe/GaSe and GaSe/Si interfaces 304 and 305 that have low interface and surface recombination, high spatial uniformity, relatively high mobility, long carrier lifetimes, and few grain boundaries. The InSe/GaSe/Si stack also has a relatively low-defect-density, smooth surface.

Atop the phase change layer or second film layer 303 of InSe is placed the capping layer 306 of an epitaxial cubic material, in this example CaF$_2$. Epitaxial cap layers may act as a growth template during the recrystallization of amorphous bits. Such a template may increase the erasure speed or encourage the recrystallized material to have the same orientation as the surrounding matrix. Correct orientation of recrystallized bits can discourage formation of certain kinds of defects. For example, large-angle grain boundaries between the recrystallized material and the matrix may prevent recovery of the initial electrical properties and thus prevent full erasure. High-angle grain boundaries could be particularly harmful in anisotropic materials such as InSe.

Other cubic materials having properties similar to CaF$_2$ may be employed in the design, as long as they are generally lattice matched to the InSe/GaSe layer disclosed and provide necessary beneficial properties based on the optical media application, such as being non-reactive, having low mass density, being composed of relatively low number atomic elements, and having acceptable transparency to visible light.

The second type of capping layer that may be employed is an electrically conducting polycrystalline or amorphous cap layer such as graphite or sp$^2$-bonded amorphous carbon. sp$^2$-bonded amorphous carbon is generally non-reactive and melts at relatively high temperatures while offering reasonable electrical conductivity. Graphite is a semimetals that strongly absorbs visible light and has a moderate electrical conductivity.

An alternate type of capping layer that may be employed is an electrically insulating capping layer such as beryllium, sp$^3$-bonded amorphous carbon, or amorphous boron nitride. Beryllium is an electrical insulator that, like sp$^3$-bonded carbon, is a good thermal conductor.

For e-beam recording, sp$^2$-bonded amorphous carbon and beryllium and mixtures thereof provide certain advantages in this arrangement due to their relatively low atomic numbers and relatively low mass densities. Other low atomic number choices such as aluminum are not optimal due to the possibility of reacting with the data storage layer phase change materials.

Conducting cap layers can provide improved collection efficiency of heterojunction diodes by reducing the need for lateral carrier transport and by making any diode bias generally more laterally uniform. High thermal conductivity of a capping layer may improve overall reliability of the media structure by making the temperature more uniform over the depth of the bit during the writing and erasing processes, thereby preventing damage due to excess surface temperatures. In other words, when performing either reading or writing tasks, a material exhibiting high thermal conductivity tends to better dissipate heat, thereby providing a more controlled writing and reading of the bits by preventing damage or excessive material change resulting from the high temperatures encountered. Too high a thermal conductivity, however, can limit the minimum size and spacing of the bits.

Figure 4:
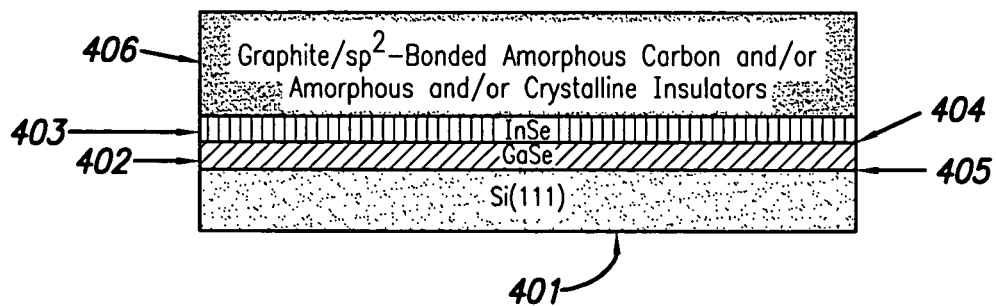
FIG. 4 shows the layering of media using a conducting capping layer, such as a polycrystalline or conducting amorphous capping layer.

FIG. 4 illustrates the typical construction of the device using a conducting polycrystalline or amorphous capping layer. Again, the silicon Si(111) layer 401 forms the bottom layer. A first film layer 402 of p-type GaSe is grown on the Si(111) layer 401. A second film layer 403 of n-type InSe is then grown on the first film layer 402 of GaSe. Alternately, InSe may be grown directly on a GaSe crystal, without using a silicon substrate. Phase-change materials other than InSe and GaSe may be used for the storage medium.

In this arrangement, the InSe second film layer 403 again forms the phase change layer or recording layer for the media. The resultant structure at this point is a three dimensional isotropic structure, and the capping material may be placed directly on the InSe second film layer 403 atop this three dimensional structure.

The InSe/GaSe/Si combination forms junctions at the InSe/GaSe and GaSe/Si interfaces 404 and 405 having the beneficial qualities described above. Atop the phase change layer or second film layer 403 of InSe is placed a conducting capping layer 406 of graphite or an sp$^2$-bonded amorphous carbon. Graphite may, in certain instances, be combined with beryllium to form capping layer 406. Use of sp2-bonded amorphous material may be advantageously employed in connection with electron beam writing and reading. Alternately, atop the phase change layer or second film layer 403 of InSe may be placed the insulating capping layer 406 of sp3-bonded carbon, or alternately beryllium or amorphous boron nitride. sp3-bonded amorphous carbon is typically not electrically conductive, and thus its use may provide certain benefits (chemical inertness and low mass density) while suffering from the drawback of nonconductivity.

The third layering arrangement that may be employed as a capping layer in this arrangement is a highly anisotropic layered material similar to graphite. Various layered chalcogenides including but not limited to GaSe, WSe$_2$, MoS$_2$, MoTe$_2$, GaS, and InS may be employed. A further discussion of layered chalcogenides may be found in "Electronic properties of van der Waals-epitaxy films and interfaces" by W. Jaegermann et al., published in "Electron Spectroscopies Applied to Low-Dimensional Materials," edited by H. P Hughes and H. I. Starnberg, Kluwer Academic Publishers, Dordrecht, 2000. These hexagonal materials have a strong thermodynamic tendency to grow in a single orientation and in continuous layers. Thus in certain circumstances thinner continuous layers of these anisotropic materials may be constructed than can be constructed using amorphous or polycrystalline isotropic materials. Amorphous or polycrystalline isotropic films can be relatively rough as compared to continuous layers of the aforementioned anisotropic materials. The anisotropic materials also have a relatively low density of dangling bonds in their terminal surfaces, thus providing a strong tendency to be non-reactive and exhibit low interface recombination rates. In addition, many of the layered materials, such as graphite, $MoTe_2$, and $SnSe_2$, have small bandgaps that are relatively conductive in the layer plane. This electrical conductivity may be useful to enable the design of heterojunction devices based on semiconductors that, like InSe and GaSe, can be difficult to dope in thin-film form. Several of these layered anisotropic materials may, like GaSe, grow epitaxially on data layer materials such as InSe, and may provide some of the beneficial effects described with respect to the epitaxial cubic materials described above.

Figure 5:
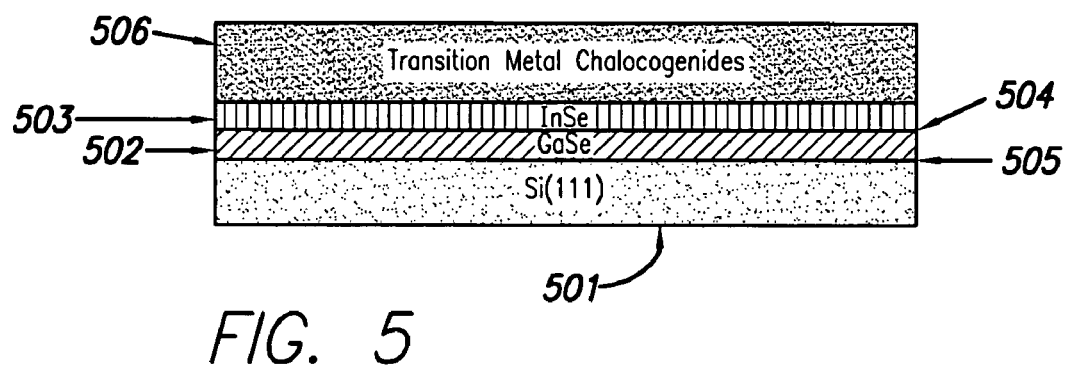
FIG. 5 is the layering of media using a highly anisotropic capping layer, such as one composed of a layered chalcogenide.

FIG. 5 presents a design using highly anisotropic layered materials, such as a layered chalcogenide as a capping layer. The silicon Si(111) layer 501 forms the bottom layer. A first film layer 502 of p-type GaSe is grown on the Si(111) layer 401, and a second film layer 503 of n-type InSe is then grown on the first film layer 502 of GaSe. InSe may be grown directly on a GaSe crystal without using a silicon substrate.

The InSe second film layer 503 forms the phase change layer or recording layer for the media. The InSe/GaSe/Si combination forms junctions at the InSe/GaSe and GaSe/Si interfaces 504 and 505 having the beneficial qualities described above. Atop the phase change layer or second film layer 503 of InSe is deposited the capping layer 506 of highly anisotropic layered material similar to graphite or various layered chalcogenides including but not limited to GaSe, $WSe_2$, $MoS_2$, $MoTe_2$, GaS, and InS.

Figure 6:
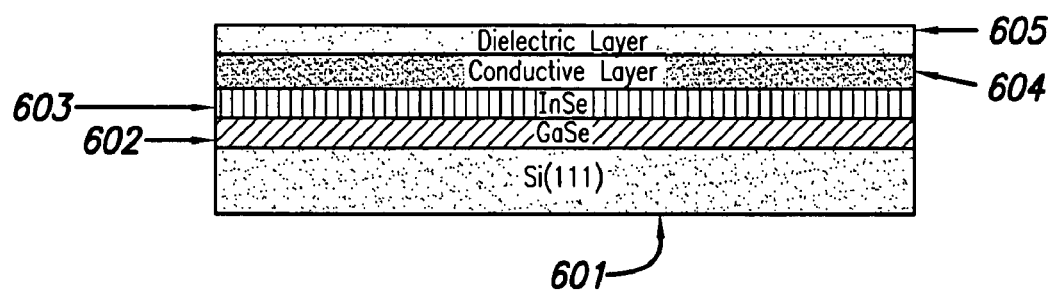
FIG. 6 illustrates the materials layered to form rewritable optical media using a capping layer composed of ultrathin layers of a robust high melting point material, such as Mo, optionally covered by a thin dielectric layer.

The design may in certain circumstances include ultrathin layers of a robust conductive material such as Molybdenum (Mo) plus an optional thin dielectric layer such as silicon oxide ($SiO_2$) for added chemical and mechanical stability as shown in FIG. 6. From FIG. 6, the Si(111) layer 601 is covered by the GaSe film layer 602, which is covered by the data layer 603 composed of InSe. Deposited on the InSe data layer 603 is a robust conductive layer 604 covered by a thin dielectric layer 605. In this arrangement, Mo has a relatively high atomic number, and may undesirably limit the transmission of electrons. However, Mo plus the $SiO_2$ dielectric cap makes possible the complete erasure of bits and limits damage in the presence of repeated write-erase cycles. The use of a thin dielectric layer in conjunction with a robust Mo layer allows for a thinner Mo layer. Use of a thinner Mo layer allows for improved electron or optical transmission while still maintaining sufficient overall robustness of the capping layers. Furthermore, the dielectric layer can help to protect the Mo layer from destructive reactions with the ambient environment during the writing or erasing processes.

The design may further employ capping layers comprised of two or more materials listed herein, such as a Carbon—$SiO_2$ bilayer. It will therefore be appreciated to those of skill in the art that the present design may be applied to other layered designs using other materials having the properties and functionality disclosed herein for high speed and high density optical writing and erasure.

Although there has been hereinabove described a method and for performing enhanced performance for phase-change media using a special capping layer, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A data storage and retrieval medium, comprising:
 a data layer capable of storing and erasing data via application of an energy beam; and
 a separate capping layer deposited on said data layer, said separate capping layer being relatively transparent to said energy beam and comprising at least one material from a group comprising:
  an epitaxial material;
  an electrically conducting material;
  a robust high melting point material; and
  the robust high melting point material combined with a thin dielectric layer.

2. The data storage and retrieval medium of claim 1, wherein said epitaxial layer comprises an epitaxial material having an ability to grow in single-crystal form on Silicon 111 (Si(111)).

3. The data storage and retrieval medium of claim 2, wherein the epitaxial material is calcium fluoride.

4. The data storage and retrieval media of claim 1, wherein the electrically conducting material comprises graphite.

5. The data storage and retrieval medium of claim 1, wherein the electrically conducting material comprises carbon.

6. The data storage and retrieval medium of claim 1, wherein the energy beam comprises a near field optical non-diffraction limited electron beam.

7. The data storage and retrieval medium of claim 1, wherein the energy beam comprises an electron beam.

8. The data storage and retrieval medium of claim 1, wherein the robust high melting point material comprises Mo.

9. A data storage and retrieval medium, comprising:
 an alterable data layer having the ability to be altered by an energy beam; and
 a separate capping layer deposited atop the data layer, the separate capping layer being relatively transparent to the energy beam and comprising at least one material from a group comprising:
  a robust high melting point material;
  an electrically conductive material; and
  an epitaxial material.

10. The data storage and retrieval medium device of claim 9, wherein said robust high melting point material comprises molybdenum.

11. The data storage and retrieval medium device of claim 9, wherein said energy beam comprises a near-field optical non-diffraction limited beam.

12. The data storage and retrieval media device of claim 9, wherein said epitaxial material comprises calcium fluoride.

13. The data storage and retrieval media device of claim 9, wherein said electrically conductive material comprises a conducting polycrystalline or amorphous capping material.

14. The data storage and retrieval media device of claim 13, wherein said conducting polycrystalline or amorphous capping material comprises at least one from a group comprising graphite and graphitic ($sp^2$-bonded) amorphous carbon.

15. The data storage and retrieval media device of claim 9, wherein said data layer comprises InSe.

16. The data storage and retrieval media device of claim 9, wherein said energy beam comprises an electron beam.

17. The data storage and retrieval media device of claim 16, wherein said group of materials further comprises at least one from a group comprising GaSe, $WSe_2$, $MoS_2$, $MoTe_2$, GaS, and InS.

18. The data storage and retrieval media device of claim 9, wherein said group of materials further comprises:
the robust high melting point material and a thin dielectric layer.

19. The data storage and retrieval media device of claim 18, wherein said robust high melting point material comprises molybdenum, and said thin dielectric layer comprises silicon oxide.

20. A method for fabricating data storage and retrieval media, comprising:
providing a data layer capable of alteration via application of an energy beam; and
depositing a capping layer upon said data layer, said capping layer being relatively transparent to the energy beam and comprising at least one material from a group comprising:
a robust high melting point material;
an electrically conductive material; a highly anisotropic layered material; and
an epitaxial material.

21. The method of claim 20, wherein said robust high melting point material comprises molybdenum.

22. The method of claim 20, wherein said low mass density material comprises an epitaxial material.

23. The method of claim 22, wherein said epitaxial material comprises calcium fluoride.

24. The method of claim 20, wherein said electrically conductive material comprises one from a group comprising a conducting polycrystalline material and a conducting amorphous material.

25. The method of claim 24, wherein said conducting polycrystalline or amorphous capping material comprises at least one from a group comprising graphite and amorphous carbon.

26. The method of claim 20, wherein said data layer comprises InSe.

27. The method of claim 20, wherein said energy beam comprises a near-field optical non-diffraction limited beam.

28. The method of claim 20, wherein said highly anisotropic layered material comprises at least one from a group comprising GaSe, $WSe_2$, $MoS_2$, $MoTe_2$, GaS, and InS.

29. The method of claim 20, wherein said group of materials further comprises:
molybdenum and a thin dielectric layer.

30. The method of claim 29, wherein said thin dielectric layer comprises silicon oxide.

31. A method for fabricating data storage and retrieval media, comprising:
providing a data layer alterable via application of an energy beam; and
depositing a capping layer upon said data layer, said capping layer being relatively transparent to the energy beam and comprising at least one material from a group comprising:
an epitaxial material;
a conducting material;
a highly anisotropic layered material;
a robust high melting point material; and
the robust high melting point material combined with a dielectric layer.

32. The method of claim 31, wherein said epitaxial layer comprises an epitaxial material having an ability to grow in single-crystal form on Silicon 111 (Si(111)).

33. The method of claim 32, wherein the epitaxial material comprises calcium fluoride.

34. The method of claim 31, wherein the conducting material comprises graphite.

35. The method of claim 31, wherein the conducting material comprises $sp^2$-bonded carbon.

36. The method of claim 31, wherein the highly anisotropic layered material comprises a layered chalcogenide.

37. The method of claim 31, wherein the highly anisotropic layered material comprises one from a group comprising graphite, GaSe, $WSe_2$, $MoS_2$, $MoTe_2$, GaS, and InS.

38. The method of claim 31, wherein said robust high melting point material comprises molybdenum.

39. The method of claim 38, wherein said dielectric layer comprises silicon oxide.

* * * * *